Nov. 13, 1928.
D. H. SCHWEYER
1,691,499
AUTOMATIC TRAIN CONTROL
Filed Dec. 24, 1924
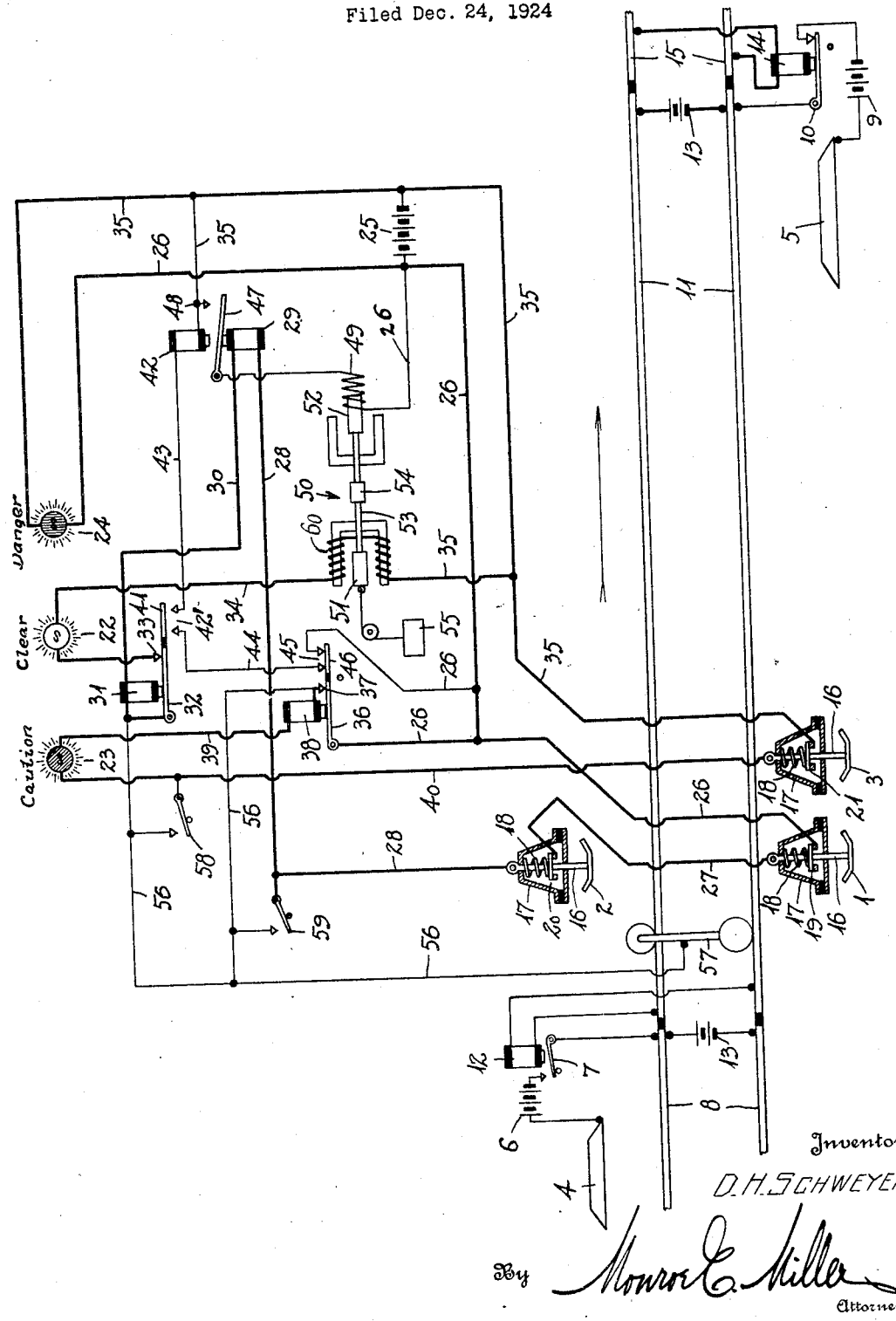
Inventor:
D. H. SCHWEYER,
By Monroe E. Miller
Attorney.

Patented Nov. 13, 1928.

1,691,499

UNITED STATES PATENT OFFICE.

DANIEL HERBERT SCHWEYER, OF EASTON, PENNSYLVANIA.

AUTOMATIC TRAIN CONTROL.

Application filed December 24, 1924. Serial No. 757,835

The present invention relates to automatic train control apparatus, and aims to provide a novel and improved combination of correlated devices for obtaining, by control from the track or road-way, clear, caution, and danger or corresponding conditions selectively in the vehicle or train equipment, either through the control of signals in the locomotive cab or other vehicle, or through mechanism for automatically controlling the progress of the train or vehicle, or both the signalling and controlling means.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the figure is a diagrammatical view of the apparatus.

The locomotive or vehicle equipment includes the shoes 1, 2 and 3, the shoes 1 and 3 being located at one side of the truck and the shoe 2 at the opposite side. The shoe 2 is adapted to ride over a ramp 4 at the corresponding side of the track and located at each of suitable control locations of the track, while the shoes 1 and 3 are adapted to ride over a ramp 5 at each of suitable control locations of the track. The ramps 4 and 5 are suitably distributed along the track according to the requirements or circumstances. As shown, the ramp 4 is connected through the track battery 6 and switch 7 with the rail section 8, while the ramp 5 is connected through the track battery 9 and switch 10 with the rail section 11. Each pair of rail sections is connected at their exit ends by or through the track circuit battery 13. The switch 7 is controlled by an electromagnet 12 bridged across the rail sections 11 at the entrance end, and the switch 10 is controlled by an electromagnet 14 bridged across the rail sections 15 at the entrance end thereof, whereby when the corresponding sections of the track are unoccupied the magnets 12 and 14 are energized from the batteries 13 to close the switches 7 and 10, whereas when the corresponding track sections are occupied the magnets 12 and 14 will be shunted to release the switches 7 and 10 so that said switches drop open. However, the means for controlling the switches 7 and 10 are of no significance so far as the present invention is concerned, and form no part of the present invention, inasmuch as said switches may be controlled or operated by any suitable means, and the ramps 4 and 5 may be located at the same control or signal location or may be offset as shown in the drawing.

The shoes 1, 2 and 3 are carried by stems or shanks 16 slidable in suitable frames 17 carried by the vehicle or car, and said shoes are depressed by suitable springs 18. The shoes 1, 2 and 3 control the corresponding contacts or switches 19, 20 and 21 which are normally closed when the shoes are depressed, and which are open when the shoes ride over the ramps.

The vehicle equipment includes the clear, caution and danger electric lamps 22, 23 and 24, respectively, or other equivalent signal or translating devices. All three lamps are lighted under clear conditions, the lamp 22 is extinguished and the lamps 23 and 24 lighted under caution conditions; and the lamp 24 only is lighted under danger conditions, whereby the extinguishing of one or more lamps will indicate abnormal conditions.

The normal circuit of the lamp 22 comprises a vehicle carried battery 25 or other source of electrical energy, conductor 26, contacts 19, conductor 27, contacts 20, conductor 28, electromagnet 29, conductor 30, electromagnet 31 of a stick relay, switch 32 of said relay, contact 33, lamp 22, conductor 34, solenoid 60, and conductor 35. If such circuit is broken at either of the contacts 19 and 20, the magnet 31 being deenergized will release the switch 32, thereby causing the lamp 22 to remain extinguished until the magnet 31 is reenergized through another circuit as will hereinafter more fully appear. Another circuit including the lamp 22 includes the battery 25, conductor 26, switch 36 of a stick relay, contact 37, conductor 56, switch 32, contact 33, lamp 22, conductor 34, solenoid 60, and conductor 35. However, this circuit does not interfere, and is broken at the contact 33 when the relay magnet 31 is deenergized, and the circuit is also broken at the contact 37 when the relay magnet 38 is deenergized.

The caution lamp 23 is included in the normally closed circuit comprising the battery 25, conductor 26, switch 36, contact 37, electromagnet 38 controlling said switch 36 as a stick relay, conductor 39, lamp 23, conductor 40, contacts 21 and conductor 35. If the circuit is broken at the contacts 21, the magnet 38 being deenergized will let the switch 36 drop open, and the circuit remains open, with the lamp 23 extinguished, until the magnet 38 is reenergized through another circuit as will hereinafter more fully appear.

The switch 32 carries an insulated switch 41 to engage contacts 42' when the switch 32 opens, so as to energize, under caution conditions, an electromagnet 42, the circuit of said magnet, under caution conditions, including the battery 25, conductor 26, a pair of contacts 45 and switch 46, conductor 44, contacts 42' and switch 41 with the switch 32 down, conductor 43, magnet 42 and conductor 35. The switch 45 is carried by and insulated from the switch 36, so that when the switch 36 drops down the circuit of the magnet 42 is broken to deenergize said magnet.

When the magnet 42 is energized it lifts a switch 47 that is normally held down by the magnet 29 in the clear circuit, to lift the switch 47 against a contact 48, the magnet 29 being deenergized when the clear circuit is broken as aforesaid. The switch 47 engaging the contact 48 will close the circuit of a solenoid 49 which complements the solenoid 60, the circuit including the battery 25, conductor 26, solenoid 49, switch 47, contact 48 and conductor 35.

The solenoids 49 and 60 form part of a control device 50 which, through pneumatic or other mechanism (not shown), controls the movement of the train or vehicle, said mechanism forming no part of the present invention. Cores 51 and 52 are movable in the solenoids 60 and 49, respectively, and are carried by a rod 53 supporting a control member 54, which has three positions. When the solenoid 60 is energized to draw the core 51 thereinto, with the solenoid 49 deenergized, the member 54 is in intermediate or clear position. When the solenoid 49 is energized to draw the core 52 thereinto the member 54 is moved to the right or into caution position, whereas when both solenoids are deenergized the member 54 is moved to the left or danger position by means of a weight 55 or other means. The member 54 can therefore control, through suitable mechanism, the movement of the vehicle or train.

Alternate holding circuits for the stick relay magnets 31 and 38 are provided when passing control locations with the track circuits closed. For this purpose, a conductor 56 is connected between the magnet 31 and switch 32 and between the contact 37 and magnet 38, and is connected to an axle or truck 57 of the vehicle so as to be grounded to the rails of the track.

A clearing switch 58 is provided to bridge the conductors 40 and 56 in order to clear the vehicle equipment, and a danger condition terminating switch 59 is provided to bridge the conductors 28 and 56, when it is desired to terminate danger conditions and to establish caution conditions. Under danger conditions, both switches 58 and 59 must be closed to obtain clear conditions, as will hereinafter more fully appear.

The lamp 24 is connected between the conductors 26 and 35 so as to be continually in circuit with the battery 25, said lamp 24 only being extinguished by failure of current or breaking of its circuit.

The apparatus operates under the normal closed circuit plan so that the failure of current, breaking, shorting or grounding of circuits, and similar contingencies will result in failures on the side of safety.

The operation of the apparatus is as follows:

Under clear running conditions in the block all three lamps 22, 23 and 24 are lighted as hereinbefore described. One circuit includes the battery 25, conductor 26, contacts 19, conductor 27, contacts 20, conductor 28, magnet 29, conductor 30, magnet 31, switch 32, contact 33, lamp 22, conductor 34, solenoid 60, and conductor 35. The second circuit includes the battery 25, conductor 26, switch 36, contact 37, magnet 38, conductor 39, lamp 23, conductor 40, contacts 21 and conductor 35. The third circuit includes the battery 25, conductor 26, lamp 24, and conductor 35. The solenoid 60 being energized will hold the member 54 in intermediate or clear position.

When the shoe 2 rides over the ramp 4 with the switch 7 closed, and the contacts 20 are separated to open the normal clear circuit, an alternate holding circuit for the magnet 31 is established. Such alternate holding circuit includes the battery 6, ramp 4, shoe 2, conductor 28, magnet 29, conductor 30, magnet 31, conductor 56, axle and wheels 57, rail sections 8 on which the vehicle is moving with the shoe 2 on the ramp 4, and switch 7. Thus, with the contacts 20 separated the alternate holding circuit keeps the magnet 31 energized, providing the switch 7 is closed, but the lamp 22 is momentarily extinguished when the shoe 2 rides over the ramp 4. When the shoe 1 rides over the ramp 5, with the switch 10 closed, a similar alternate holding circuit is established to keep the magnet 31 energized, such circuit including the battery 9, ramp 5, shoe 1, conductor 27, contacts 20, conductor 28, magnet 29, conductor 30, magnet 31, conductor 56, wheels and axle 57, rail sections 11, and switch 10, but the lamp 22 is momentarily extinguished when the shoe 1 rides over the ramp 5. Also, when the shoe 3 rides over the ramp 5 with the switch 10 closed, an alternate holding circuit for the magnet 38 is provided to keep said magnet energized, said circuit including the battery 9, ramp 5, shoe 3, conductor 40, lamp 23, conductor 39, magnet 38, conductor 56, wheel and axle 57, rail sections 11 and switch 10.

Therefore, with the track switches 7 and 10 closed the vehicle can pass the ramps without disturbing the normal clear conditions of the vehicle equipment.

Under caution track conditions, with the switch 7 open, caution conditions in the vehicle equipment are established. Thus, when the shoe 2 rides over the ramp 4 to open the circuit of the lamp 22 at the contacts 20, the alternate holding circuit is also open at the switch 7, so that the magnets 29 and 31 become deenergized, the switch 32 moving open thereby keeping the corresponding stick relay open and the lamp 22 extinguished. The normal circuit of the caution lamp 23 remains energized, and under these conditions the solenoid 60 is deenergized and the solenoid 49 energized. Thus, when the switch 32 drops down the switch 41 engages the contacts 42', thereby closing the circuit including the battery 25, conductor 26, contacts 45 and switch 46, conductor 44, contacts 42' and switch 41, conductor 43, magnet 42 and conductor 35. The magnet 42 raises the switch 47 against the contact 48, the magnet 29 being deenergized thereby closing the circuit of the solenoid 49. The member 54 is therefore moved toward the right or caution indicating position.

If, when travelling under caution conditions, the switch 58 is closed (same being under lock and key so as to be operable only by an authorized person) the vehicle equipment can be cleared. Thus, a clearing circuit is established including the battery 25, conductor 26, contacts 19, conductor 27, contacts 20, conductor 28, magnet 29, conductor 30, magnet 31, switch 58, conductor 40, contacts 21 and conductor 35. The magnet 31 is thus reenergized to raise the switch 32 which will immediately restore normal clear running conditions.

Under danger track conditions, with the switch 10 open, danger conditions in the vehicle equipment are established when the shoes 1 and 3 pass over the ramp 5. Said shoes 1 and 3 may constitute or operate as a unit, although shown as separate units in the drawing. The shoe 3 being raised will open the circuit of the lamp 23 at the contacts 21, thereby deenergizing the magnet 38 so that the caution stick relay remains open, and the shoe 1 riding over the ramp 5 will break the circuit of the lamp 22 at the contacts 19. Consequently, all of the circuits of the vehicle equipment, with the exception of the circuit of the lamp 24, are deenergized, with the magnets 29, 31, 38 and 42 deenergized, as well as the solenoids 49 and 60. The lamps 22 and 23 are therefore deenergized, and the member 54 is moved to the left or danger position. When the shoes 1 and 3 pass over the ramp 5, the switch 10 being open will prevent the alternate holding circuits for the magnets 31 and 38 being closed.

When proceeding under danger conditions, should the switch 59 (which is also under lock and key to prevent unauthorized closing thereof) be closed, caution conditions are established, the circuit including the battery 25, conductor 26, contacts 19, conductor 27, contacts 20, conductor 28, switch 59, conductor 56, magnet 38, conductor 39, lamp 23, conductor 40, contacts 21 and conductor 35. The magnet 38 is therefore reenergized to raise the switch 36, and with the switch 32 down the caution circuits are closed. If at the same time, the switch 58 is also closed clear conditions are established as hereinbefore described.

The apparatus may be simplified by the elimination of the magnet 29 and switch 47, and letting the magnet 42 take the place of or represent the solenoid 49, it being noted that the magnet 29 is simply used as a precaution to hold the switch 47 down under clear conditions, and that the magnet 42 and solenoid 49 are always simultaneously energized and deenergized, the magnet 42 and switch 47 simply providing a relay for the circuit of the solenoid 49.

The stems 16 and shoes 1, 2 and 3 may be made hollow, if desired, and connected to the train line brake pipe of the air brake system so that if any of them are broken the brakes will be applied on the train.

Having thus described the invention, what is claimed as new is:—

1. Train control apparatus including two normally closed electrical vehicle circuits having normally energized visual signal devices therein for different controlling conditions, and means, having cooperable elements on the vehicle and track, controlling said circuits when passing control locations of the track for deenergizing either one or both of said devices.

2. Train control apparatus including a plurality of normally closed electrical vehicle circuits having normally energized visual signal devices therein for different control conditions, alternate holding circuits controlling said devices, and means, having cooperable elements on the track and vehicle, controlling said circuits when passing control locations of the track for deenergizing either one or more of said devices.

3. Train control apparatus including a plurality of normally closed electric vehicle circuits having normally energized visual signal devices therein for different conditions of control and also having shoe-operated circuit breakers therein, ramps at control locations of the track for operating said circuit breakers, alternate holding circuits controlling said devices connected with said circuit breakers for electrical connection with the ramps, and means on the track connected with said ramps for selectively controlling said alternate holding circuits.

4. Train carried control apparatus including two normally energized visual signal devices for different controlling conditions, and means for deenergizing either one or both of said devices when passing control locations of the track.

5. Train control apparatus including two normally closed electrical vehicle circuits having normally energized translating devices therein for different controlling conditions, a pair of circuit breakers connected in series in one of said circuits, a third circuit breaker in the other circuit, and two means on the track for controlling said circuit breakers, one of said pair of circuit breakers being arranged to be operated by one of said means and the other of said pair of circuit breakers and the third circuit breaker being arranged to be operated by the other of said means.

6. Train control apparatus including two normally closed electrical vehicle circuits having normally energized translating devices therein for different controlling conditions, a pair of circuit breakers connected in series in one circuit, a third circuit breaker in the other circuit, two means on the track for controlling said circuit breakers when passing control locations of the track to break said circuits, one of said pair of circuit breakers being arranged to be operated by one of said means and the other of said pair of circuit breakers and the third circuit breaker being arranged to be operated by the other of said means, and means for selectively keeping said devices energized when passing the control locations with said circuits broken.

7. Train control apparatus including two normally closed electrical vehicle circuits having normally energized translating devices therein for different controlling conditions, a pair of circuit breakers in one of said circuits connected in series therein, a third circuit breaker in the other circuit, and two ramps at different transverse positions of the track to operate the circuit breakers for breaking said circuits, one of said pair of circuit breakers being arranged to be operated by one of said ramps and the other of said pair of circuit breakers and the third circuit breaker being arranged to be operated by the other ramp.

8. Train control apparatus including two normally closed electrical vehicle circuits having normally energized translating devices therein for different controlling conditions, a pair of circuit breakers in one of said circuits connected in series therein, a third circuit breaker in the other circuit, two ramps at different transverse positions of the track to operate the circuit breakers for breaking said circuits, one of said pair of circuit breakers being arranged to be operated by one of said ramps and the other of said pair of circuit breakers and the third circuit breaker being arranged to be operated by the other ramp, alternate holding circuits for said devices cooperable with said ramps, and means on the track connected to said ramps for controlling said alternate holding circuits.

9. Train control apparatus including a pair of translating devices for different controlling conditions on the vehicle, a pair of receiving devices controlling one of said translating devices, a third receiving device controlling the other translating device, and two means on the track at different transverse positions for controlling said receiving devices, one of said pair of receiving devices being arranged to be operated by one of said means and the other of said pair of receiving devices and the third receiving device being arranged to be operated by the other of said means.

10. Train control apparatus including a pair of translating devices on the vehicle for different controlling conditions, a pair of receiving devices controlling one of the translating devices and located at different positions transversely of the track, a third receiving device controlling the other translating device, and two means on the track at different positions transversely thereof for controlling said receiving devices, one of said pair of receiving devices being arranged to be operated by one of said means and the other of said pair of receiving devices and the third receiving device being arranged to be operated by the other of said means.

In testimony whereof I hereunto affix my signature.

DANIEL HERBERT SCHWEYER.